(12) United States Patent
Aronica et al.

(10) Patent No.: US 7,244,502 B2
(45) Date of Patent: Jul. 17, 2007

(54) HYBRID COATING

(75) Inventors: Alain Aronica, Saint-Dizier (FR); David Coutouly, Bettancourt-la-Ferrée (FR); Damian Macaya, Grao de Castellon (ES); Remy Caisse, Sermaize-les-Bains (FR)

(73) Assignee: Ferro France - S.A.R.L., Saint Dizier, Cedex (FR)

( * ) Notice: Subject to any disclaimer, the term of this patent is extended or adjusted under 35 U.S.C. 154(b) by 92 days.

(21) Appl. No.: 11/054,303

(22) Filed: Feb. 9, 2005

(65) Prior Publication Data
US 2005/0148722 A1    Jul. 7, 2005

Related U.S. Application Data

(62) Division of application No. 10/276,367, filed as application No. PCT/EP01/05468 on May 14, 2001, now Pat. No. 6,896,934.

(30) Foreign Application Priority Data
May 29, 2000  (EP)  .................. 00111512

(51) Int. Cl.
  B32B 15/04  (2006.01)
  B32B 15/18  (2006.01)
  B32B 15/20  (2006.01)
  B32B 18/00  (2006.01)

(52) U.S. Cl. ............... 428/421; 428/422; 428/426; 428/457; 428/626; 428/629; 428/702

(58) Field of Classification Search .......... 501/20, 501/24; 428/626, 629, 421, 422, 426, 457, 428/702
See application file for complete search history.

(56) References Cited

U.S. PATENT DOCUMENTS

| | | | |
|---|---|---|---|
| 3,257,317 A | * | 6/1966 | Ferault et al. ............ 508/104 |
| 3,607,349 A | | 9/1971 | Dereich |
| 3,647,500 A | * | 3/1972 | Mizuno ............... 428/143 |
| 3,850,867 A | | 11/1974 | Hartmann |
| 4,861,657 A | | 8/1989 | Nishino et al. |
| 5,212,122 A | | 5/1993 | Pannhorst et al. |
| 6,083,612 A | | 7/2000 | Okita |

FOREIGN PATENT DOCUMENTS

| | | |
|---|---|---|
| EP | 0829308 A1 | 3/1998 |
| FR | 1336665 | 7/1963 |
| WO | WO/96/38236 | 5/1996 |

* cited by examiner

Primary Examiner—Ramsey Zacharia
(74) Attorney, Agent, or Firm—Rankin, Hill, Porter & Clark LLP

(57) ABSTRACT

The present invention provides a composition for use in forming an abrasion-resistant easy-to-clean coating on a substrate. The composition according to the invention includes a mixture of a fluorocarbon polymer component and an enamel-forming component. The enamel-forming component includes at least a first lead-free and cadmium-free glass frit. The first lead-free and cadmium-free glass frit includes from about 30% to about 50% $P_2O_5$, from about 15% to about 30% $Al_2O_3$, and from about 2% to about 40% $X_2O$ where X=Na and/or K. The present invention also provides a method of forming an abrasion-resistant easy-to-clean coating on a substrate. The method includes applying the composition according to the invention to a substrate and sintering the applied composition to fuse an abrasion-resistant easy-to-clean coating to the substrate. The method can be used to apply the composition to a variety of substrate materials such as metals, glass, ceramics, and stone, using a variety of application techniques such as wet spraying, screen printing, electrophoresis, dry electrostatic deposition, wet dipping, and flow coating.

15 Claims, No Drawings

HYBRID COATING

CROSS-REFERENCE TO RELATED APPLICATIONS

This application is a division of prior application Ser. No. 10/276,367, filed May 16, 2003, now U.S. Pat. No. 6,896,934, which was filed as a U.S. national stage of PCT/EP01/05468, filed May 14, 2001, and claims priority to EP 00111512.0, filed May 29, 2000.

BACKGROUND OF THE INVENTION

1. Field of Invention

The present invention provides a composition for use in forming an abrasion-resistant easy-to-clean coating on a substrate, and a method of forming an abrasion-resistant easy-to-clean coating on a substrate.

2. Description of Related Art

Fluorocarbon polymers, such as, for example, polytetrafluoroethylene (PTFE), polymers of chlorotrifluoroethylene (CTFE), fluorinated ethylene-propylene copolymers (FEP), polyvinylidene fluoride (PVDF), and hexafluoropropylene (HFP), are known to have superior non-stick properties. For this reason, they have been used in a wide variety of applications, including forming non-stick coatings on articles of cookware, bakeware, iron sole plates, food contacting surfaces of small appliances, snow shovels and plows, chutes and conveyors, saws, hoppers, and other industrial containers. However, due to the inherent non-stick nature of these and other fluorocarbon polymers, it has been difficult to form non-stick coatings that adhere well to substrates such as metals and ceramics. Moreover, due to the inherent softness of fluorocarbon polymers, it has been difficult to form non-stick coatings that resist abrasion.

In an effort to overcome these difficulties, it has been the conventional practice to apply one or more base coats containing adhesive resins in order to better adhere fluorocarbon polymer top coats to substrates (throughout this specification and in the claims, the terms "base coat" and "primer coat" are used interchangeably). In general, such base coats comprise a combination of high temperature binder resins, such as polyamideimide resins, polyethersulfone resins, or polyphenylene sulfide resins, and fluorocarbon polymer resins. The performance of these conventional non-stick coating systems is based upon a stratification of the applied coatings. This stratification results in a coating that is rich in high temperature binder on the bottom and rich in fluorocarbon polymer at the top. The binder-rich bottom provides adhesion to the substrate while the fluorocarbon polymer-rich top provides a layer to which subsequent fluorocarbon polymer top coats can be fused by sintering at high temperature.

The performance of such non-stick coating systems is at best a compromise. The bottom layer of the base coats is not a purely binder resin. Considerable levels of fluorocarbon polymer resins must be included in the base coats in order to provide a layer that is sufficiently rich in fluorocarbon polymer to promote good bonding of subsequent fluorocarbon polymer top coats to the base coat. The presence of fluorocarbon polymer resins in the base coat are disadvantageous because they detract from the adhesion of the base coat to the substrate. Therefore, it has been necessary to roughen substrates by mechanical (e.g. grit blasting) or chemical (e.g. etching) means to assist holding the base coat to the substrate.

Moreover, because both the adhesive resins and fluorocarbon polymers are relatively soft, there have been difficulties in making these non-stick coatings resistant to abrasive wear. Efforts to overcome these deficiencies have included the addition of mica particles, ceramic fillers, or metal flakes to the intermediate and top coat in order to increase the hardness. The presence of these fillers can be disadvantageous. For example, incorporation of metal flakes in the applied coatings can actually promote chemical corrosion of the underlying metal substrate due to dissimilarity between the metals. Moreover, these particulate fillers cannot be incorporated into the non-stick coating at high levels because at high levels they diminish the non-stick properties of the coating and the bonding to the substrate.

Due to the limitations thus described, articles of cookware coated with conventional fluorocarbon polymer non-stick coating systems are prone to damage and abrasive wear during normal use. Cooking utensils, for example, often cause cuts, slices, or gouges in the non-stick coating, which permit acids or alkaline foodstuffs and cleaning agents to penetrate to the exposed substrate and cause corrosion. Corrosion of the underlying substrate by these materials can further weaken the adhesion of the non-stick coating adjacent to the cut or slice. Moreover, abrasive forces routinely encountered in cooking and cleaning cause the gradual removal of the soft fluorocarbon polymer top coat resulting in diminished non-stick properties. Conventional non-stick coatings simply do not adequately protect the substrate from corrosion or the fluorocarbon polymer top coat from routine abrasive wear.

Compositions are known for use in forming porcelain enamel coatings that are very resistant to abrasion and chemical wear. Unfortunately, such known porcelain enamel coatings do not possess non-stick properties comparable to fluorocarbon polymer coatings. Moreover, such known porcelain enamel coatings are generally not considered to possess so called "Easy-to-Clean" properties. Despite considerable effort, past attempts to formulate a composition that can be used to form a coating on substrates that exhibits the excellent non-stick attributes of fluorocarbon polymer coatings as well as the abrasion resistance of porcelain enamels have heretofore been largely unsuccessful.

BRIEF SUMMARY OF THE INVENTION

The present invention provides a composition for use in forming an abrasion-resistant easy-to-clean coating on a substrate. The composition according to the invention comprises a mixture of a fluorocarbon polymer component and an enamel-forming component. The fluorocarbon polymer component can comprise one or a blend of polymers that are either fully or partially fluorinated. Polymers and copolymers containing PTFE are presently most preferred. The enamel-forming component comprises at least a first lead-free and cadmium-free glass frit comprising by weight from about 30% to about 50% $P_2O_5$, from about 15% to about 30% $Al_2O_3$, from about 2% to about 40% $X_2O$ where X=Na and/or K.

The present invention also provides a method of forming an abrasion-resistant easy-to-clean coating on a substrate. The method comprises applying a composition according to the invention to a substrate and sintering the composition to form and fuse an abrasion-resistant easy-to-clean coating to the substrate. The composition can be applied to substrates using a variety of application techniques such as wet spraying, screen printing, electrophoresis, dry electrostatic deposition, wet dipping, and flow coating.

Coatings formed using the composition and method according to the present invention are abrasion-resistant and easy-to-clean. Such coatings exhibit excellent acid resistance and are hydrophobic. Various pigments and colorants can be added to the composition to produce a wide variety of colored coatings including, but not limited to, black, gray, green, blue, and brown. Alternatively, one or more color-producing metallic oxides can be added to the glass component during smelting to impart color to the coating. The color of the coatings can be made to be very dark to very light depending upon the amount and type of colorant used. The sintered coating is stain resistant.

The composition can be applied to coat a variety of substrate materials such as, for example, metals, glass, ceramic, and stone. The coating can be applied to a wide variety of products, including cookware, exterior and interior surfaces of appliances such as ranges, ovens, washing machines, and dishwashers, sanitary ware, and architectural products such as galvanized steel panels, terra cotta roofing tiles, and masonry.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The novel composition according to the present invention is particularly useful for forming an abrasion-resistant easy-to-clean coating on a substrate. Throughout the specification and in the appended claims, the term "abrasion-resistant" means that the applied sintered coating is removed at a rate of less than 10.0 $g/m^2$ according to the PEI TABER method (1500 cycles), and the term "easy-to-clean" means that the applied sintered coating scores 20 or better (Class A) according to the Easy-To-Clean Test (FAN Procedure), which is described in detail below.

The composition according to the present invention comprises a mixture of a fluorocarbon polymer component and an enamel-forming component. The term "mixture" describes the physical blend of the fluorocarbon polymer component and the enamel-forming component that comprise the composition. The term "mixture" is not intended to suggest that there is any chemical reaction between the two components, which probably does not occur. The fluorocarbon polymer component comprises less than about 50% by weight of the composition, and preferably from about 2.5% by weight to about 30% by weight of the composition. The enamel-forming component comprises at least about 40% by weight of the composition, and preferably from about 50% by weight to about 97.5% by weight of the composition.

The fluorocarbon polymer component comprises one or a blend of polymers and/or copolymers that are either fully or partially fluorinated. Fully fluorinated polymers suitable for use in the invention include polymers and copolymers of PTFE, tetrafluoroethylene-perfluoromethylvinylether (MFA), and perfluoroalkoxy polymers (PFA) such as perfluoromethylvinylether (PMVE or P(MVE)-TFE)) and perfluoropropylvinylether (PPVE or P(PVE)-TFE). Partially fluorinated polymers suitable for use in the invention include polymers and copolymers of PVDF, CTFE, and modified PTFE. PTFE polymers and/or copolymers containing PTFE are presently most preferred for use in the invention because such polymers and copolymers possess excellent properties (e.g., they are hydrophobic, non-toxic, and non-sticky) and do not degrade at the temperatures of use and sintering.

Depending upon the application technique to be used to form the coating, the fluorocarbon polymer component can be mixed with the enamel-forming component while dispersed in a liquid or as a dry solid powder. In a preferred embodiment, the fluorocarbon polymer component comprises an aqueous dispersion of PTFE, PFA, PPVE, PMVE, MFA, HFP, and/or modified PTFE. Preferably, the fluorocarbon polymers in these aqueous dispersions have an average particle size within the range of from about 50 nm to about 10 microns, and more preferably within the range of from about 150 nm to about 10 microns. It will be appreciated that such dispersions can have a bimodal or multi-modal particle size distribution.

The enamel-forming component comprises at least a first lead-free and cadmium-free glass frit. Throughout the specification and in the appended claims, the term "lead-free and cadmium-free glass frit" means that no PbO and/or CdO is intentionally added during production of the glass, and that the total amount of PbO and/or CdO in the fritted glass is less than about 0.1% by weight.

The first lead-free and cadmium-free glass frit comprises by weight from about 30% to about 50% $P_2O_5$, from about 15% to about 30% $Al_2O_3$, and from about 2% to about 40% $X_2O$ where X=Na and/or K. Thus, the first lead-free and cadmium-free glass frit can be characterized as an aluminum phosphate glass frit. Various aluminum phosphate glass frits can be used as the first lead-free and cadmium-free glass frit in the invention provided they meet the previously stated compositional ranges.

The first lead-free and cadmium-free glass frit preferably comprises by weight from about 30% to about 50% $P_2O_5$, from about 15% to about 30% $Al_2O_3$, from about 2% to about 40% $X_2O$ where X=Na and/or K, up to about 12% $B_2O_3$, up to about 10% ZnO, up to about 8% $SiO_2$, up to about 5% $Li_2O$, up to about 3% MnO, up to about 3% CoO, up to about 3% NiO, up to about 3% CuO, up to about 3% $Sb_2O_3$, up to about 3% $Fe_2O_3$, and up to about 3% $MoO_3$. The first lead-free and cadmium-free glass frit can also comprise by weight up to about 15% fluorine above the weight of the other components in the frit.

The first lead-free and cadmium-free glass frit can be smelted in all known types of smelters, including continuous, rotary, electrical, and induction smelters. Typically, selected oxides are smelted at temperatures of from about 1200° C.±100° C. for about 30±10 minutes. Smelting temperatures and times will vary considerably depending upon the composition of the frit. The molten glass is then converted to glass frit using water-cooled steel rollers or water quenching. It will be appreciated that the step of producing the first lead-free and cadmium-free glass frit is not per se critical and any of the various techniques well-known to those skilled in the art can be employed.

The enamel-forming component of the composition according to the invention can further comprise one or more additional lead-free and cadmium-free aluminum phosphate glass frits. Additional glass frits can be used to improve bonding and acid resistance. Preferably, the enamel-forming component comprises from about 60% to about 100% by weight of the first lead-free and cadmium-free glass frit and up to about 40% by weight of a second lead-free and cadmium-free glass frit or combinations of the second lead-free and cadmium-free glass frit and other lead-free and cadmium-free aluminum phosphate glass frits. The second lead-free and cadmium-free glass frit preferably comprises by weight from about 30% to about 50% $P_2O_5$, from about 2% to about 40% $X_2O$ where X=Na and/or K, from about 10% to about 30% $Al_2O_3$, up to about 12% $SiO_2$, up to about 8% $B_2O_3$, up to about 5% $Li_2O$, up to about 5% NiO, up to about 4% MnO, up to about 3% CoO, up to about 3% CuO, up to about 3% $Sb_2O_3$, up to about 3% $Fe_2O_3$, and up to about 3% $MoO_3$. The second lead-free and cadmium-free glass frit can also comprise by weight up to about 15% fluorine above the weight of the other components in the frit. The second lead-free and cadmium-free glass frit can be produced in the same manner as the first lead-free and cadmium-free glass frit.

The composition can also include one or more pigments and/or mill additions, which are typically, but not necessarily, milled together with the enamel-forming component. Suitable pigments and mill additions include, for example, titanium dioxide, inorganic pigments, potassium hydroxide, sodium metasilicate, sodium silicate, clay, quartz, bentonite, magnesium carbonate, potassium nitrite, sodium aluminate, and boric acid. Inorganic materials, such as silica, zirconia, alumina, spodumene, and feldspar, can also be added to the composition in order to modify the texture and/or to adjust the roughness of the sintered coating. Inorganic oxides (pigments) used to color the composition can be added so as to comprise up to about 20% by weight of the solids portion of the composition without significantly degrading the desired properties in the sintered coating. Other mill additions, such as texture enhancers and pH adjusters, preferably comprise up to about 10% by weight of the solids portion of the composition. It will be appreciated that the selection of pigments, and/or mill additions must be made in view of the technique by which the composition is to be applied to a substrate and the desired texture and/or color of the sintered coating.

The composition according to the invention can further comprise a vehicle. Suitable vehicles include, for example, water and organic vehicles such as pine oil. It will be appreciated that the type and amount of vehicle used in the composition is not per se critical, and that the selection of a vehicle will depend on the particular technique being employed to apply the composition to the substrate.

The present invention is also directed to a method of forming an abrasion-resistant easy-to-clean coating on a substrate. The method comprises providing a substrate; providing a composition for use in forming an abrasion-resistant easy-to-clean coating on a substrate as previously described; applying the composition to the substrate; and sintering the composition to fuse the coating to the substrate. Suitable substrate materials include metals, glass, ceramic, and stone.

Metal substrates do not have to be pretreated prior to application of the composition. The composition can be applied to: steel, including hot rolled steel, enamel ground-coated steel, aluminized steel, pickled nickel-coated steel, stainless steel, and galvanized steel; cast iron; aluminum, including alloys of aluminum, enamel base-coated aluminum, and aluminum-containing surfaces coated with the composition described in WO 00/56537; and copper, including alloys of copper. Although it is not necessary in most instances, the metal surface can be pretreated to enhance adhesion. Such pretreatment can include for example, grit or sandblasting, phosphating, and acid or aklaline degreasing.

Application of the composition to the substrate can be accomplished by a variety of application techniques including, for example, wet spraying, screen printing, electrophoresis, dry electrostatic deposition, wet dipping, and flow coating. Sintering is preferably accomplished by heating the applied composition to a temperature of from about 400° C. to about 580° C. for about 2 to about 25 minutes. During sintering, the fluorocarbon polymer melts. It will be appreciated that sintering temperatures and times will vary depending upon the thickness of the applied composition and the characteristics of the substrate to which it has been applied.

If too much fluorocarbon polymer is present in the composition (i.e., more than about 50% by weight), the coating can easily become overfired during sintering, which results in rapid deterioration of the sintered coating. While it is possible to adjust the firing conditions to avoid such deterioration during sintering, the mechanical properties of the resulting coating are less than desired. Conversely, if too little fluorocarbon polymer is present in the composition (i.e., less than about 1.0% by weight), the sintered coating usually does not possess some of the desired properties, such as hydrophobicity and easiness to clean. Thus, the amount of fluorocarbon polymer present in the composition is preferably within the range of from about 2.5% to about 35% by weight.

Coatings formed using the composition and method according to the present invention are abrasion-resistant and easy-to-clean. Such coatings exhibit excellent acid resistance and are hydrophobic. By incorporating various pigments and colorants in the composition, a wide variety of colored coatings can be produced including, but not limited to, black, gray, green, blue, and brown. Such colored coatings can be made to appear very dark to very light depending upon the amount and type of colorant used.

The coating can be applied to a wide variety of products. The coating is particularly useful for application to cookware because it is scratch-resistant and provides excellent food release properties. The coating can easily withstand conventional cooking temperatures, resists staining, and is not damaged when subjected to many dishwashing cycles.

The composition is also useful for application to exterior and interior surfaces of appliances such as ranges, ovens, washing machines, and dishwashers. The coating can be formed so as to provide a very glossy appearance that is not adversely affected by repeated exposure to high temperatures conventionally generated in such appliances. Because of its excellent abrasion-resistance and food contact resistance, the coating is particularly suitable for application to the interior surfaces of oven cavities, cooking hobs, range tops, and burner grates.

The coating can also be applied to sanitary ware, such as bathtubs and sinks. The coating resists staining, is very durable, and is detergent and water resistant. Additionally, the coating can be applied to architectural products such as galvanized steel panels, terra cotta roofing tiles, and masonry. The coating can be used to seal porous products and provide a surface that is graffiti resistant.

The sintered coating preferably exhibits an acid resistance of A or better according to ISO 2722, a hardness of 5 or better on the Mohs scale, and is removed at a rate of less than 10.0 g/m$^2$ according to the PEI TABER method (1500 cycles). In addition, the sintered coating preferably exhibits a score of 20 or better according to the Easy-To-Clean Test (FAN Procedure), and a score of 4 N or better according to the Scratch-Resistance Test (NEN 2713). Several of these testing methods are discussed below:

Easy-To-Clean Test (FAN Procedure)

The Easy-To-Clean Test, which is also known as the FAN Procedure, is used to objectively measure the ease with which baked-on foods can be removed from a coating. The letters "FAN" are an abbreviation of the French phrase facile a nettoyer, which translates to English as "easy-to-clean." In this test, samples of the following foods are separately applied at room temperature to coated 10 cm×10 cm coupons that are also at room temperature: ketchup; lemon juice; salted milk (4 g of salt per liter of milk); fresh egg yolk; and Viandox (meat juice). Raschig rings are attached to the coated coupons using SILICOMET JT545 silicone adhesive. A 1 g sample of each food is placed within each ring on the surface of the coated coupon. The coupons are then placed into a preheated oven and heated for 30 minutes at 250° C. The coupons are then removed from the oven and allowed to cool to room temperature. The Raschig rings and silicone adhesive are then removed from the coated coupons and each coupon is wiped 6 times with the abrasive side of a wet Vileda Graffix sponge using the same force (the brand of sponge is not per se critical, and any common household sponge that has an abrasive side and a non-abrasive side can be used). The temperature of the water retained in the sponge is preferably about 40° C. The coupon is given the highest score at which all of the baked-on food can be removed according to the following scoring system:

| Step | Cleaning Method | Pressure | Score |
|---|---|---|---|
| 1 | Surface of coupon completely cleaned by wiping with abrasive side of sponge. | 1 kg | 5 |
| 2 | Surface of coupon completely cleaned by wiping with abrasive side of sponge. | 3 kg | 4 |
| 3 | Surface of coupon completely cleaned by wiping with abrasive side of sponge. | 6 kg | 3 |
| 4 | Surface of coupon completely cleaned by wiping with abrasive side of sponge and more detergent. | 6 kg | 2 |
| 5 | Food residue remains on surface of coupon even after wiping with abrasive side of sponge and more detergent. | 6 kg | 1 |

The score for all five foods is summed, and the coating is given a classification according to the following scale:

| Total | Class |
|---|---|
| 5 to 9 points | D |
| 10 to 14 points | C |
| 15 to 19 points | B |
| 20 to 25 points | A |

Scratch-Resistance Test (NEN 2713)

The Scratch-Resistance Test (NEN 2713) is used to objectively measure the ability of an applied coating to resist scratching. In this test, coated 10 cm×10 cm coupons are fixed to the turntable of an Erichsen 413D Scratch Resistance Tester. The stylus is placed against the surface of the coupon at an initial load of 10 N and the coupon is rotated one complete turn. Next, the stylus is placed about 2 mm closer to the center of the coupon, the load on the stylus is decreased, and the coupon is rotated one complete turn. A number of cycles/scratches are made with ever decreasing loads (the number of cycles is usually 12 or less) until the load on the stylus has been decreased to 0.1 N.

After the scratching has been completed, the coupon is cleaned by wiping with a clean dry paper towel. Each quadrant of the scratched coupon is then seperately colored using a felt tip pen. The felt pens contain red, blue, black, and green inks, respectively, that provide a surface discoloration of less than about $\Delta E=10$ (Cielab colorimetric values) after dry wiping on unscratched coated surfaces. After the inks have dried (at least one minute), the quadrants the inks are wiped from each quadrant using a separate dry clean paper towel. The coupons are then visually examined at a distance of 25 cm. The scratch resistance is reported as the last highest load at which less than 50% of the ink was retained within a circular scratch for any of the colors.

The following examples are intended only to illustrate the invention and should not be construed as imposing limitations upon the claims.

EXAMPLE I

Lead-free and cadmium-free aluminum phosphate glass frits A and B were prepared by smelting selected oxides (and an additional amount by weight of F and $NO_2$ above the weight of the oxides) in a smelting pot. Glass Frit A was smelted at about 1200° C. for about 30 minutes. Glass Frit B was smelted at about 1150° C. for about 30 minutes. In both cases, the molten glass was converted to frit using water cooled rollers. The frits had the following composition in weight percent:

| Component | Frit A | Frit B |
|---|---|---|
| $P_2O_5$ | 39.57 | 40.85 |
| $Al_2O_3$ | 24.68 | 20.95 |
| $Na_2O$ | 17.91 | 20.94 |
| $B_2O_3$ | 5.28 | 2.51 |
| $K_2O$ | 4.41 | 0 |
| $SiO_2$ | 2.34 | 6.07 |
| ZnO | 2.95 | 0 |
| $Li_2O$ | 1.31 | 1.05 |
| NiO | 0.49 | 2.40 |
| MnO | 0.37 | 1.84 |
| CoO | 0.22 | 1.05 |
| $Fe_2O_3$ | 0.20 | 0.95 |
| CuO | 0.10 | 0.52 |
| $Sb_2O_3$ | 0.10 | 0.52 |
| $MoO_3$ | 0.07 | 0.37 |
| F* | 5.63 | 8.06 |
| $NO_2$* | 2.35 | 2.62 |

*NOTE:
As in all instances throughout this application and in the appended claims, the amount of F and $NO_2$ is above 100.00%.

EXAMPLE II

Enamel-forming components 1 and 2 were formed using the lead-free and cadmium-free aluminum phosphate glass frits prepared in Example I by wet milling the following ingredients (in parts by weight) to a fineness of less than about 1.0 cm³ being retained from a 50.0 cm³ sample on a 400 mesh sieve:

| Ingredient | Enamel Component 1 | Enamel Component 2 |
|---|---|---|
| Glass Frit A | 100.0 | 80.0 |
| Glass Frit B | 0 | 20.0 |
| $TiO_2$ | 10.0 | 6.0 |
| F 6340 Black Oxide Pigment (FERRO) | 0 | 8.0 |

-continued

| Ingredient | Enamel Component 1 | Enamel Component 2 |
|---|---|---|
| KOH | 1.5 | 1.05 |
| Sodium Metasilicate | 1.5 | 0.25 |
| Water | 50 | 50 |

EXAMPLE III

A fluorocarbon polymer component was prepared by dispersing 60.0 grams of polytetrafluoroethylene powder purchased from DYNEON as TF 9207 in 40.0 grams of water using 0.5 grams of a perfluorinated alkyl salt as a dispersing agent. The polytetrafluoroethylene powder had an average particle size of about 4.0 μm.

EXAMPLE IV

Compositions A and B were formed by mixing the enamel-forming components prepared in Example II with the fluorocarbon polymer component prepared in Example III using a mixer as follows:

| Ingredient | Composition A | Composition B |
|---|---|---|
| Enamel-Forming Component 1 | 100 g. | 0 |
| Enamel Forming Component 2 | 0 | 100 g. |
| Fluorocarbon Polymer Component | 30 g. | 30 g. |

EXAMPLE V

An aluminum frying pan (diameter 28 cm, thickness 3 mm) was degreased using an alkali washing liquid. Composition A from Example IV was applied to the aluminum cooking surface of the frying pan by wet spraying using a conventional spray gun (orifice diameter 0.5-0.8 mm) at the rate of about 100-150 g/m$^2$. The sprayed aluminum frying pan was then placed in an oven at a temperature of about 80-100° C. for about 7 minutes to dry the composition. The sprayed aluminum frying pan was then placed into an oven at a temperature of about 500° C. for about 10 minutes to sinter the applied coating. After sintering, the aluminum frying pan was removed from the oven and allowed to cool to room temperature. The applied sintered coating had a smooth, dark gray appearance. The thickness of the applied sintered coating was approximately 50 μm.

The coated surface of the aluminum frying pan was tested for acid resistance according to ISO 2722, hardness on the Mohs scale, easiness to clean according to the Easy-To-Clean Test (FAN Procedure), and scratch resistance in accordance with the Scratch-Resistance Test (NEN 2713). The results of these tests are reported below together with the results of tests performed on a conventional polytetrafluoroethylene coating (in all tests, the conventional polytetrafluoroethylene coating was a stratified coating containing pigments and coating hardeners presently available on cookware sold in the commercial holloware market):

| Test | Score for Coating | Score for PTFE |
|---|---|---|
| Mohs Hardness | 6 | 1 |
| Acid Resistance | AA | AA |
| Easiness to Clean | 25 | 25 |
| Scratch Resistance | 4.0 N | 2.1 N |

Visual inspection of the frying pan following the Easy-To-Clean Test revealed that the tested surface was hardly stained.

EXAMPLE VI

Composition B from Example IV was applied by wet spraying using a conventional spray gun at a rate of about 100-150 g/m$^2$ to a fired ground-coated sheet steel blank. The sprayed sheet steel blank was then placed in an oven at a temperature of about 80-100° C. for about 7 minutes to dry the composition. The sprayed sheet steel blank was then placed into an oven at a temperature of about 475° C. for about 10 minutes to sinter the applied coating. After sintering, the sheet steel blank was removed from the oven and allowed to cool to room temperature. The applied sintered coating had a smooth, dark gray appearance. The thickness of the applied sintered coating was approximately 60 μm.

The coated surface of the sheet steel blank was tested for acid resistance according to ISO 2722, hardness on the Mohs scale, easiness to clean according to the Easy-To-Clean Test (FAN Procedure), and in accordance with the Cross Hatched Tape Test (ASTM D-3359-95a). The results of these tests are reported below together with the results of tests performed on a conventional polytetrafluoroethylene coating:

| Test | Score for Coating | Score for PTFE |
|---|---|---|
| Mohs Hardness | 5–6 | 1 |
| Acid Resistance | AA | AA |
| Easiness to Clean | 24 | 25 |
| Cross Hatched Tape | 4B | 5B |

Visual inspection of the coated sheet steel blank following the Easy-To-Clean Test revealed that the tested surface was hardly stained.

EXAMPLE VII

An aluminized steel plate was degreased using alkali washing liquid. Composition A from Example IV was applied to the aluminized surface of the steel plate by wet spraying using a conventional spray gun at the rate of about 100-150 g/m$^2$. The sprayed aluminized steel plate was then placed in an oven at a temperature of about 80-100° C. for about 7 minutes to dry the composition. The sprayed aluminized steel plate was then placed into an oven at a temperature of about 500° C. for about 10 minutes to sinter the applied coating. After sintering, the aluminized steel plate was removed from the oven and allowed to cool to room temperature. The applied sintered coating had a smooth, dark gray appearance. The thickness of the applied sintered coating was approximately 50 μm.

The coated surface of the aluminized steel plate was tested for acid resistance according to ISO 2722, hardness on the Mohs scale, easiness to clean according to the Easy-To-Clean Test (FAN Procedure), and scratch resistance in accordance with the Scratch-Resistance Test (NEN 2713). The results of these tests are reported below together with the results of tests performed on a conventional polytetrafluoroethylene coating:

| Test | Score for Coating | Score for PTFE |
| --- | --- | --- |
| Mohs Hardness | 6 | 1 |
| Acid Resistance | AA | AA |
| Easiness to Clean | 25 | 25 |
| Scratch Resistance | 4.0 N | 2.1 N |

Visual inspection of the coated aluminized steel plate following the Easy-To-Clean Test revealed that the tested surface was hardly stained.

EXAMPLE VIII

Composition B from Example IV was applied by wet spraying using a conventional spray gun at a rate of about 100-150 g/m² to a ceramic shard that had previously been fired at around 1000° C. The sprayed shard was then placed in an oven at a temperature of about 80-100° C. for about 7 minutes to dry the composition. The sprayed shard was then placed into an oven at a temperature of about 475° C. for about 10 minutes to sinter the applied coating. After sintering, the shard was removed from the oven and allowed to cool to room temperature. The applied sintered coating had a smooth, dark gray appearance. The thickness of the applied sintered coating was approximately 50 μm.

The coated surface of the shard was tested for acid resistance according to ISO 2722, hardness on the Mohs scale, and easiness to clean according to the Easy-To-Clean Test (FAN Procedure). The results of these tests are reported below together with the results of tests performed on a conventional polytetrafluoroethylene coating:

| Test | Score for Coating | Score for PTFE |
| --- | --- | --- |
| Mohs Hardness | 5–6 | 1 |
| Acid Resistance | AA | AA |
| Easiness to Clean | 24 | 25 |

EXAMPLE IX 47.5 g. of lead-free and cadmium-free aluminum phosphate glass frit A from Example I, 35.0 g. of lead-free and cadmium-free aluminum phosphate glass frit B from Example I, and 7.5 g. powdered mica were dry milled together to a fineness of about 1.0% residue being retained on a 400 mesh sieve. 17.5 g. of polytetrafluoroethylene powder having an average particle size of 4.0 μm was mixed with the previously milled ingredients. The mixture was then slowly added to 35.0 g. of pine oil and blended until it had a homogeneous appearance.

The composition was applied by screen printing to surface of an aluminum frying pan that had previously been coated with Composition A as in Example V. The screen-printed aluminum frying pan was then placed in an oven at a temperature of about 80-100° C. for about 7 minutes to dry the composition. The aluminum frying pan was then placed into an oven at a temperature of about 500° C. for about 10 minutes to sinter the applied screen-printed coating. After sintering, the aluminum frying pan was removed from the oven and allowed to cool to room temperature. The sintered screen-printed coating had a smooth, copper appearance. The thickness of the sintered screen-printed coating was approximately 20-30 μm.

The sintered screen-printed surface of the aluminum frying pan was tested for acid resistance according to ISO 2722, hardness on the Mohs scale, easiness to clean according to the Easy-To-Clean Test (FAN Procedure), and scratch resistance in accordance with the Scratch-Resistance Test (NEN 2713). The results of these tests were identical to the results reported for the coating in Example V. Visual inspection of the screen-printed frying pan following the Easy-To-Clean Test revealed that the tested surface was hardly stained.

EXAMPLE X 100 parts by weight of lead-free and cadmium-free aluminum phosphate glass frit A from Example I, 13.3 parts by weight of lead-free and cadmium-free aluminum phosphate glass frit B from Example I, and 8.0 parts by weight F 6340 Black Oxide Pigment (FERRO) were dry milled together to a fineness of about 1.0% residue being retained on a 400 mesh sieve. 30 parts by weight of PFA powder having an average particle size of about 4.0 μm was mixed with the previously milled ingredients together with an organopolysiloxane. The resulting powder had a bulk resistivity of about $5 \times 10^{15}$ ohm/cm to about $80 \times 10^{15}$ ohm/cm. After milling, the composition was applied using a standard corona discharge gun at 50 kV to about 100 kV to a 25 cm×25 cm×0.5 mm sheet steel coupon that had previously been coated with a conventional enamel ground coat. The application rate of the dry composition was about 400 g/m². The sheet steel coupon was then placed into an oven at a temperature of about 475° C. for about 10 minutes to sinter the applied coating. After sintering, the sheet steel coupon was removed from the oven and allowed to cool to room temperature. The applied sintered coating had a smooth, dark gray appearance. The thickness of the applied sintered coating was approximately 40 μm.

The coated surface of the sheet steel coupon was tested for acid resistance according to ISO 2722, hardness on the Mohs scale, easiness to clean according to the Easy-To-Clean Test (FAN Procedure), and scratch resistance in accordance with the Scratch-Resistance Test (NEN 2713). The results of these tests are reported below together with the results of tests performed on a conventional polytetrafluoroethylene coating:

| Test | Score for Coating | Score for PTFE |
| --- | --- | --- |
| Mohs Hardness | 6 | 1 |
| Acid Resistance | AA | AA |
| Easiness to Clean | 25 | 25 |
| Scratch Resistance | 4.0 N | 2.1 N |

The foregoing examples demonstrate that a coating formed using the composition and method according to the invention is substantially harder and more scratch-resistant than conventional polytetrafluoroethylene coatings, but provides similar non-stick and easy-to-clean properties.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. An article of cookware comprising a substrate having a single-layer coating fused thereon, wherein the single-layer coating comprises a sintered mixture comprising:

from about 2.5% to about 50% by weight of a fluorocarbon polymer component; and from about 50% to about 97.5% by weight of an enamel-forming component, wherein the enamel-forming component comprises at least a first lead-free and cadmium-free glass frit comprising by weight from about 30% to about 50% $P_2O_5$, from about 15% to about 30% $Al_2O_3$, from about 2% to about 40% $X_2O$ where X=Na and/or K, up to about 12% $B_2O_3$, up to about 10% ZnO, up to about 8% $SiO_2$, up to about 5% $Li_2O$, up to about 3% MnO, up to about 3% CoO, up to about 3% NiO, up to about 3% CuO, up to about 3% $Sb_2O_3$, up to about 3% $Fe_2O_3$, and up to about 3% $MoO_3$.

2. The article of cookware according to claim 1 wherein the enamel-forming component further comprises a second lead-free and cadmium-free glass frit, the second lead-free and cadmium-free glass frit comprising by weight from about 30% to about 50% $P_2O_5$, from about 2% to about 40% $X_2O$ where X=Na and/or K, from about 10% to about 30% $Al_2O_3$, up to about 12% $SiO_2$, up to about 8% $B_2O_3$, up to about 5% $Li_2O$, up to about 5% NiO, up to about 4% MnO, up to about 3% CoO, up to about 3% CuO, up to about 3% $Sb_2O_3$, up to about 3% $Fe_2O_3$, and up to about 3% $MoO_3$.

3. The article of cookware according to claim 2 wherein the first lead-free and cadmium-free glass frit and/or the second lead-free and cadmium-free glass fit further comprises by weight up to about 15% fluorine above the weight of the other components in the fit.

4. The article of cookware according to claim 1 wherein the substrate comprises a material selected from the group consisting of metals, glass, ceramics, and stone.

5. The article of cookware according to claim 4 wherein the metal substrate comprises steel.

6. The article of cookware according to claim 5 wherein the steel is selected from the group consisting of hot rolled steel, aluminized steel, and stainless steel.

7. The article of cookware according to claim 5 wherein the metal substrate comprises cast iron.

8. The article of cookware according to claim 5 wherein the metal substrate comprises aluminum or cast aluminum.

9. The article of cookware according to claim 5 wherein the metal substrate comprises copper.

10. The article of cookware according to claim 1 wherein the sintered mixture further comprises pigments and/or mill additions.

11. An article of cookware comprising a substrate having a single-layer coating fused thereon, wherein the single-layer coating comprises a sintered mixture comprising:

from about 2.5% to about 50% by weight of a fluorocarbon polymer component; and from about 50% to about 97.5% by weight of an enamel-forming component, wherein the enamel-forming component comprises at least a first lead-free and cadmium-free glass frit comprising by weight from about 30% to about 50% $P_2O_5$, from about 15% to about 30% $Al_2O_3$, and from about 2% to about 40% $X_2O$ where X=Na and/or K, and up to about 12% $B_2O_3$.

12. The article of cookware according to claim 11 wherein the enamel-forming component further comprises a second lead-free and cadmium-free glass frit, the second lead-free and cadmium-free glass frit comprising by weight from about 30% to about 50% $P_2O_5$, from about 2% to about 40% $X_2O$ where X=Na and/or K, from about 10% to about 30% $Al_2O_3$, up to about 12% $SiO_2$, up to about 8% $B_2O_3$, up to about 5% $Li_2O$, up to about 5% NiO, up to about 4% MnO, up to about 3% CoO, up to about 3% CuO, up to about 3% $Sb_2O_3$, up to about 3% $Fe_2O_3$, and up to about 3% $MoO_3$.

13. The article of cookware according to claim 11 wherein the fluorocarbon polymer component comprises one or a blend of polymers and/or copolymers that are either fully or partially fluorinated.

14. The article of cookware according to claim 13 wherein the polymers and/or copolymers are selected from the group consisting of PTFE, modified PTFE, MFA, PFA, HFP, CTFE, FEP, and PVDF.

15. An architectural product comprising a substrate having a single-layer coating fused thereon, wherein the single-layer coating comprises a sintered mixture comprising:

from about 2.5% to about 50% by weight of a fluorocarbon polymer component; and from about 50% to about 97.5% by weight of an enamel-forming component, wherein the enamel-forming component comprises at least a first lead-free and cadmium-free glass frit comprising by weight from about 30% to about 50% $P_2O_5$, from about 15% to about 30% $Al_2O_3$, and from about 2% to about 40% $X_2O$ where X=Na and/or K, and up to about 12% $B_2O_3$.

* * * * *